(12) United States Patent
Aga et al.

(10) Patent No.: US 12,235,756 B2
(45) Date of Patent: Feb. 25, 2025

(54) APPROACH FOR PERFORMING EFFICIENT MEMORY OPERATIONS USING NEAR-MEMORY COMPUTE ELEMENTS

(71) Applicant: Advanced Micro Devices, Inc., Santa Clara, CA (US)

(72) Inventors: Shaizeen Aga, Santa Clara, CA (US); Johnathan Alsop, Bellevue, WA (US); Nuwan Jayasena, Santa Clara, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 113 days.

(21) Appl. No.: 17/557,568

(22) Filed: Dec. 21, 2021

(65) Prior Publication Data

US 2023/0195618 A1  Jun. 22, 2023

(51) Int. Cl.
  *G06F 12/06* (2006.01)
(52) U.S. Cl.
  CPC .................................. *G06F 12/06* (2013.01)
(58) Field of Classification Search
  CPC ... G06F 12/0692; G06F 12/06; G06F 12/0811
  USPC .......................................... 711/154, 200, 118
  See application file for complete search history.

(56) References Cited

U.S. PATENT DOCUMENTS

| | | | |
|---|---|---|---|
| 7,584,329 B2 * | 9/2009 | Fields, Jr. ........... | G06F 12/0831 711/119 |
| 9,575,759 B2 * | 2/2017 | Cho .................... | G06F 12/0638 |
| 2010/0088487 A1 | 4/2010 | Yuasa | |
| 2015/0089119 A1 * | 3/2015 | Conklin .............. | G06F 12/0246 711/103 |
| 2015/0106560 A1 * | 4/2015 | Perego ................ | G06F 12/0638 711/105 |
| 2016/0098200 A1 | 4/2016 | Guz et al. | |
| 2016/0378340 A1 * | 12/2016 | Amidi .................... | G06F 3/061 711/103 |
| 2020/0026498 A1 | 1/2020 | Sumbul et al. | |

(Continued)

OTHER PUBLICATIONS

The International Bureau of WIPO, "International Preliminary Report on Patentability" in International Application No. PCT 2022/053241 filed Dec. 16, 2022, 6 pages.

*Primary Examiner* — Yaima Rigol
*Assistant Examiner* — Edward Waddy, Jr.
(74) *Attorney, Agent, or Firm* — Hickman Becker Bingham Ledesma LLP (57) ABSTRACT

Near-memory compute elements perform memory operations and temporarily store at least a portion of address information for the memory operations in local storage. A broadcast memory command is then issued to the near-memory compute elements that causes the near-memory compute elements to perform a subsequent memory operation using their respective address information stored in the local storage. This allows a single broadcast memory command to be used to perform memory operations across multiple memory elements, such as DRAM banks, using bank-specific address information. In one implementation, the approach is used to process workloads with irregular updates to memory while consuming less command bus bandwidth than conventional approaches. Implementations include using conditional flags to selectively designate address information in local storage that is to be processed with the broadcast memory command.

20 Claims, 7 Drawing Sheets

(56) References Cited

U.S. PATENT DOCUMENTS

2021/0019076 A1    1/2021  Kim et al.
2021/0224155 A1*   7/2021  Bains .................. G06F 11/1048
2021/0374055 A1   12/2021  Aga et al.
2022/0067536 A1*   3/2022  Datla ....................... G06N 3/04

* cited by examiner

Bank 0 | Bank 1
Row = 1, Col = 0 | Row = 1, Col = 0

200 Baseline PIM
pim_read-add (bank 0, row 1, col 0, val 1)
pim_store (bank 0, row 1, col 0)
pim_read-add (bank 1, row 1, col 0, val 2)
pim_store (bank 1, row 1, col 0)

210 Grouped PIM
pim_read-add (bank 0, row 1, col 0, val 1)
pim_read-add (bank 1, row 1, col 0, val 2)
pim_store (bank 0, row 1, col 0)
pim_store (bank 1, row 1, col 0)

220 Coalesced (regular) PIM
pim_read-add (bank 0, row 1, col 0, val 1)
pim_read-add (bank 1, row 1, col 0, val 2)
pim_broadcast_store (row 1, col 0)

FIG. 2B

Bank 0 | Bank 1
Row = 1, Col = 0 | Row = 2, Col = 1

200 Baseline PIM
pim_read-add (bank 0, row 1, col 0, val 1)
pim_store (bank 0, row 1, col 0)
pim_read-add (bank 1, row 2, col 0, val 2)
pim_store (bank 1, row 1, col 0)

210 Grouped PIM
pim_read-add (bank 0, row 1, col 0, val 1)
pim_read-add (bank 1, row 2, col 1, val 2)
pim_store (bank 0, row 1, col 0)
pim_store (bank 1, row 2, col 1)

220 Coalesced (regular) PIM
pim_read-add (bank 0, row 1, col 0, val 1)
pim_read-add (bank 1, row 2, col 1, val 2)
pim_store (bank 0, row 1, col 0)
pim_store (bank 1, row 2, col 1)

230 Coalesced (irregular) PIM
pim_read-add+ (bank 0, row 1, col 0, val 1)
pim_read-add+ (bank 1, row 2, col 1, val 2)
pim_broadcast_conditional_store

```
┌─────────────────────────────────────────────────────────────┐
│ A memory controller issues near-memory compute commands to  │
│ multiple near-memory compute elements                   402 │
└─────────────────────────────────────────────────────────────┘
                              ↓
┌─────────────────────────────────────────────────────────────┐
│ The near-memory compute elements perform their respective   │
│ computations and store the results and address information  │
│ in local storage                                            │
│                                                         404 │
└─────────────────────────────────────────────────────────────┘
                              ↓
┌─────────────────────────────────────────────────────────────┐
│ The memory controller issues a broadcast conditional near-  │
│ memory command to the near-memory compute elements          │
│                                                         406 │
└─────────────────────────────────────────────────────────────┘
                              ↓
┌─────────────────────────────────────────────────────────────┐
│ The near-memory compute elements perform the memory         │
│ operation specified by the broadcast conditional near-memory│
│ command using the results and address information from      │
│ local storage                                           408 │
└─────────────────────────────────────────────────────────────┘
```

FIG. 4B

APPROACH FOR PERFORMING EFFICIENT MEMORY OPERATIONS USING NEAR-MEMORY COMPUTE ELEMENTS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads.

The benefits of PIM are best realized when a memory controller issues a broadcast PIM command to multiple target banks in parallel, causing all of the target banks to perform the same operation on the same memory cell (row, column). This works well for workloads with regular accesses to memory, i.e., updates that target the same memory cell across multiple banks. For workloads with irregular accesses to memory, i.e., accesses that target different memory cells (different row and/or column) across banks, however, the benefits of PIM are more limited because a separate PIM command has to be issued to each bank, which consumes more command bus bandwidth. Examples of workload with irregular accesses to memory include Deep Learning Recommendation Models (DLRMs), machine learning, and graph analytics.

Efforts have been made to address the shortcomings of using PIM for workloads with irregular memory accesses. For example, one such approach involves using careful data placement in software instructions to transform irregular accesses to regular accesses that can be more efficiently processed by existing PIM solutions such as coalesced-regular PIM implementations described hereinafter. This solution, however, can greatly increase software development costs and is not always possible where the irregularity in workloads is dynamic and varies depending upon the input. Another approach issues broadcast PIM commands to multiple target banks in parallel, but with bank-specific addresses being generated near memory. This solution provides the benefit of using broadcast PIM commands to perform memory operations but requires issuing a separate command to each bank to prepare the bank-specific address information and also requires tighter coupling between addressing logic/data and memory logic/data. Yet another approach involves using coarse-grained PIM commands that perform multiple steps, such as read-modify-write, instead of fine-grained PIM commands to reduce the number of PIM commands required to process workloads. While this solution can reduce the number of PIM commands on the command bus, it can make it more difficult to interleave processor memory accesses and PIM accesses and can also increase the number of read-write turnarounds (and associated overhead) in DRAM.

As an alternative to using PIM, workloads with irregular updates to memory can be processed by host processors, such as CPUs, GPUs, etc., however with high costs attributable to moving large amounts of data from memory to processor-side caches. This can also lead to cache pollution that can adversely affect other computations whose data is evicted from caches to process the irregular updates to memory.

In view of the foregoing, there is therefore a need for an approach for processing workloads with irregular accesses to memory using near-memory compute elements that consumes less command bus bandwidth than conventional approaches.

BRIEF DESCRIPTION OF THE DRAWINGS

Implementations are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
III. Using Near-Memory Compute Elements to Process Memory Operations Using Stored Address Information
  A. Overview and Background
  B. Using Stored Address Information
  C. Local Storage
  D. Memory Controller Considerations

I. Overview

An approach is provided for performing efficient memory operations using near-memory compute elements. According to the approach, near-memory compute elements perform memory operations and temporarily store at least a portion of address information for the memory operations in local storage. A broadcast memory command is then issued to the near-memory compute elements that causes the near-memory compute elements to perform a subsequent memory operation using their respective address information stored in the local storage. As used herein, the term "local storage" refers to any type of storage that is implemented in a memory module for use by the near-memory compute elements. This allows a single broadcast memory command to be used to perform memory operations across multiple memory elements, such as DRAM banks, using bank-specific address information. This technical solution reduces the command bus bandwidth required for using near-memory compute elements to perform memory operations compared to conventional approaches that require a separate memory command for each memory element. The approach also provides fine granularity to software developers to perform memory operations using near-memory compute elements.

The approach has broad applicability to different contexts. In one implementation, the approach is used to process workloads with irregular updates to memory while consuming less command bus bandwidth than conventional approaches. According to this approach, the near-memory compute elements also store results of computations and use the results with their respective stored address information to perform the subsequent memory operation specified by the broadcast memory command. Implementations include using conditional flags to selectively designate address information in local storage that is to be processed with the broadcast memory command.

Figure 1A:
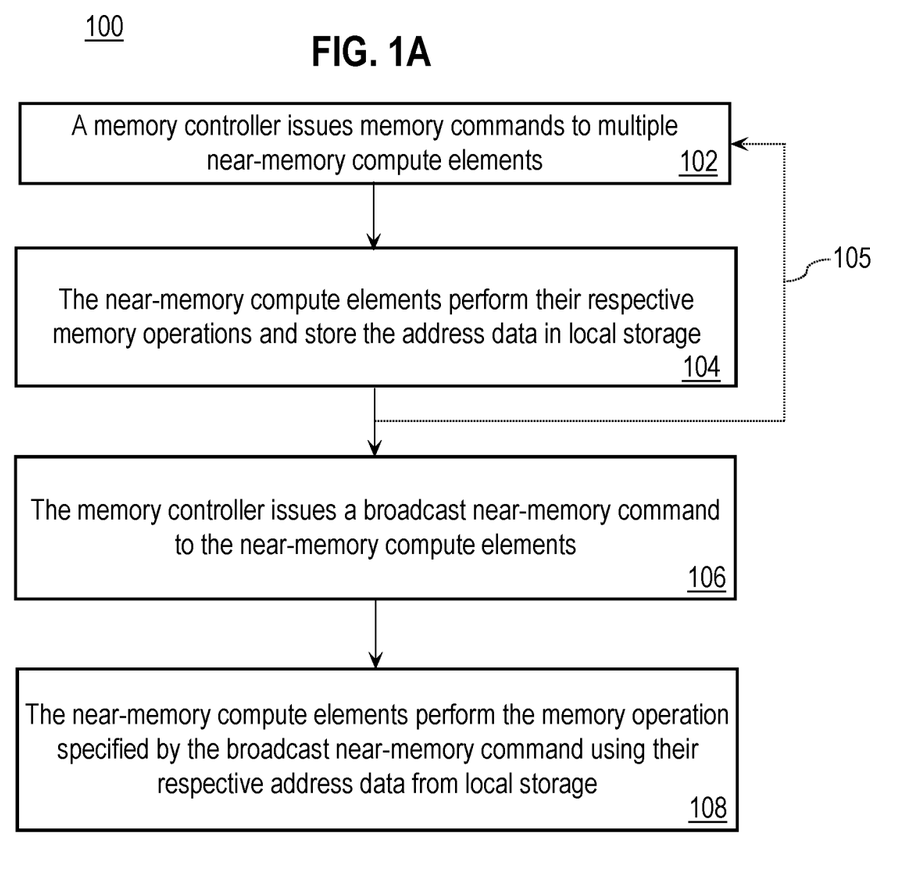
FIG. 1A is a flow diagram that depicts an approach for performing efficient memory operations using near-memory compute elements.

FIG. 1A is a flow diagram 100 that depicts an approach for performing efficient memory operations using near-memory compute elements. In step 102, a memory controller issues memory commands to multiple near-memory compute elements. The near-memory compute elements may be, for example, PIM execution units for banks in a DRAM module, and the memory commands may be the same or different for the near-memory compute elements, depending upon a particular implementation.

In step 104, the near-memory compute elements perform their respective memory operations and store at least a portion of the address information for their respective memory operations in local storage. As indicated by reference number 105, steps 102 and 104 are repeated for any number and types of memory commands and for any number of near-memory compute elements.

Sometime later, in step 106, the memory controller issues a broadcast near-memory command to the near-memory compute elements. According to an implementation, the broadcast near-memory command specifies particular near-memory compute elements to process the broadcast near-memory command, e.g., by one or more bit values or a bit mask.

In step 108, the near-memory compute elements perform the memory operation specified by the broadcast near-memory command using their respective address information from local storage. This approach provides for performing memory operations using near-memory compute elements using different address information, but with fewer commands than conventional approaches that use a separate command for each near-memory compute element.

II. Architecture

Figure 1B:
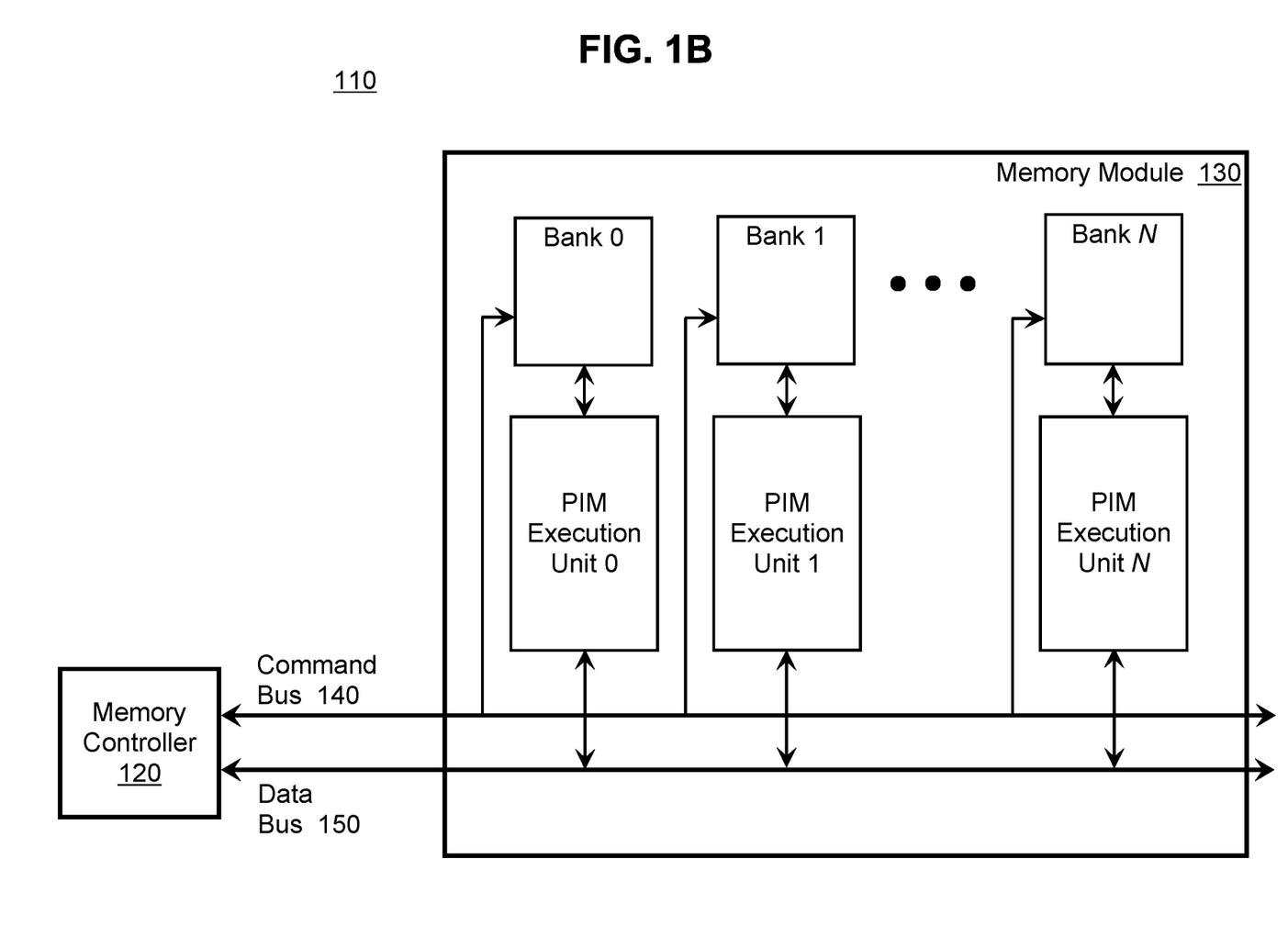
FIG. 1B is a block diagram that depicts a memory arrangement.

FIG. 1B is a block diagram that depicts a memory arrangement 110. The memory arrangement 110 includes a memory controller 120 and a memory module 130. The memory controller 120 and the memory module 130 are communicatively coupled via a command bus 140 and a data bus 150. As used herein, the term "bus" refers to any type of wired or wireless electrical coupling, such as wires, conductors, and/or wireless communications links. Implementations are depicted in the figures and described herein in the context of a single memory module 130 for purposes of explanation, but implementations are applicable to memory arrangements with any number of memory modules. The memory arrangement 110 may include other elements that are not depicted in the figures and described herein for purposes of explanation.

The memory controller 120 manages the flow of data going to and coming from the memory module 130 and may be implemented as a stand-alone element, for example on a separate die from a microprocessor, implemented separate from but on the same die as a microprocessor, or integrated into a microprocessor as an integrated memory controller. Implementations are appliable to any type of microprocessor including, for example, Central Processing Units (CPUs), Graphics Processing Units (GPUs), Application-Specific Integrated Circuits (ASICs), Field-Programmable Logic Arrays (FPGAs), accelerators, and Digital Signal Processors (DSPs). Implementations are applicable to any type of memory controller 120 and according to an implementation, the memory controller 120 includes processing logic that is configured to issue commands to the memory module 130.

The memory module 130, which may be for example a DRAM memory module, includes a memory array having N+1 banks (Bank 0-Bank N) with corresponding PIM execution units (PIM Execution Unit 0-PIM Execution Unit N). Each bank may include cells defined by a two-dimensional array, but implementations are not limited to DRAM memory modules or banks per se, or banks with memory cells defined by a two-dimensional array and are applicable to other memory cell organizations. The memory array and banks may include other elements, such as buffers and decoders, that are not depicted in the figures and described herein for purposes of explanation.

The PIM execution units include processing logic and storage, such as local registers, for processing PIM commands, e.g., to perform logical operations, arithmetic operations, etc. Although the example of FIG. 1 depicts a separate PIM execution unit for each bank, implementations include a PIM execution unit, and the corresponding processing logic and storage, servicing multiple (or all) banks. Although implementations are depicted in the figures and described herein in the context of PIM-based memory modules, implementations are not limited to this context and are applicable to non-PIM-based memory modules.

III. Using Near-Memory Compute Elements to Process Memory Operations Using Stored Address Information

A. Overview and Background

The approach described herein for performing memory operations by near-memory compute elements using stored address information has broad applicability to a variety of contexts. By way of comparison, using processor-side compute elements to perform irregular updates to large tables of data in memory required by applications such as DLRM, machine learning, and graph analytics can put severe pressure on memory sub-systems and increase data movement costs to bring data into processor-side caches, only in many cases to perform a simple update on the data. This can also cause cache pollution, which can adversely affect other processor-side computations that could have used the cache more effectively.

In contrast, using PIM to perform workloads with irregular updates to memory allows for significantly more memory bandwidth than is available at host processors. As such, offloading workloads with irregular updates to memory to PIM can reduce data movement in and out of memory modules and avoid cache pollution. As previously mentioned, however, the benefits of PIM are more limited when processing workloads that require irregular updates to memory because a separate PIM command needs to be issued to each bank, which consumes more command bus bandwidth.

Figure 2A:
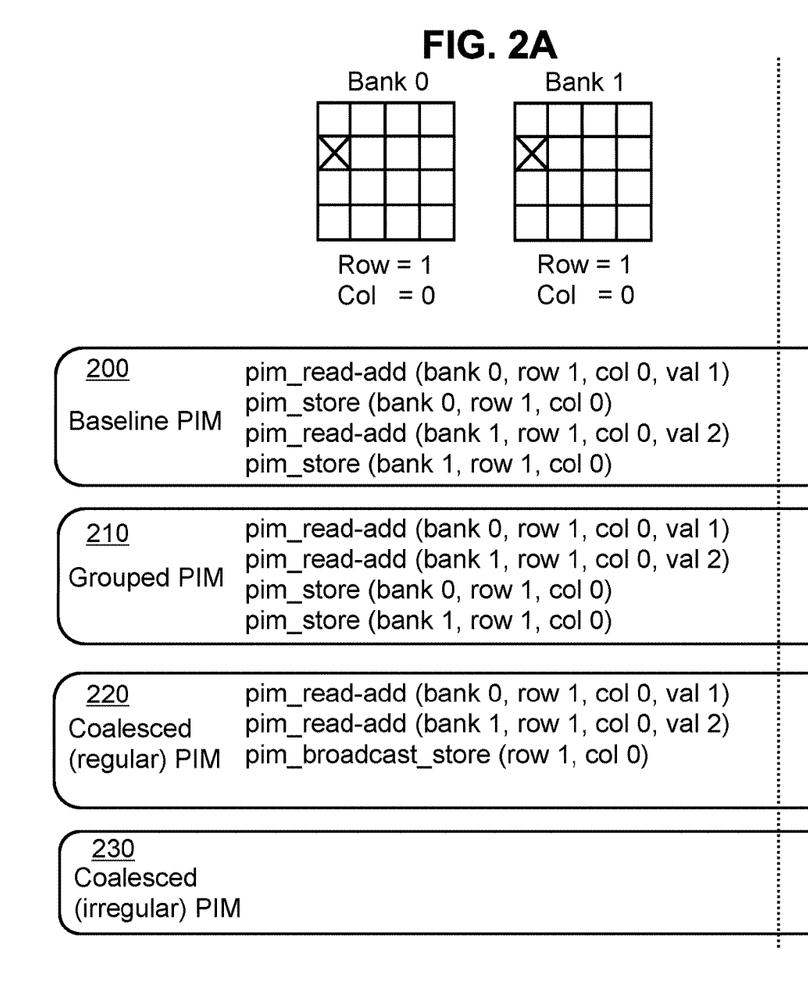
FIG. 2A depicts a regular update to the same memory cell in two banks.
Figure 2B:
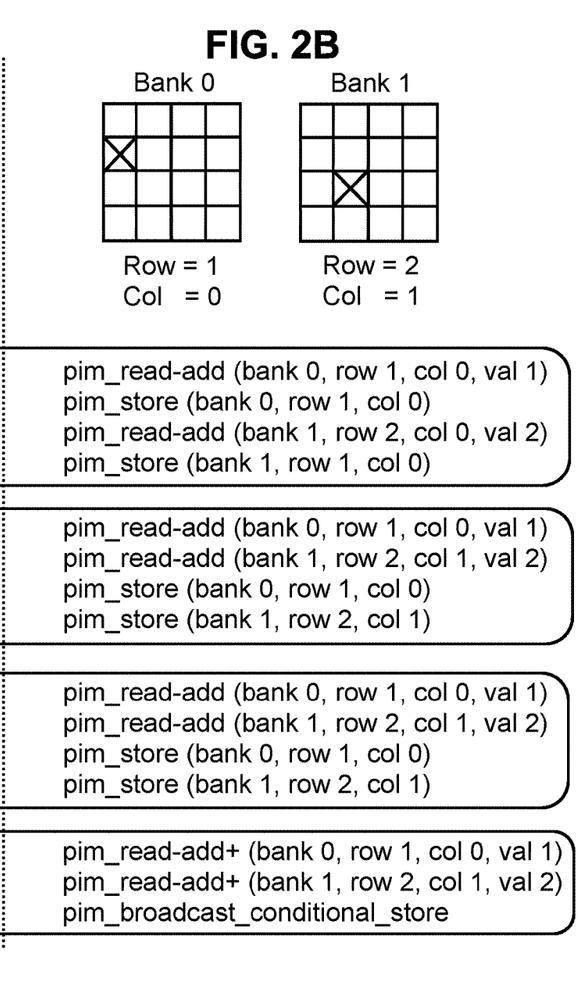
FIG. 2B depicts an irregular update to different memory cells in two banks.

FIGS. 2A and 2B depict various approaches for using PIM to process workloads with regular and irregular updates to memory, respectively. FIG. 2A depicts a regular update to the same memory cell (row 1, column 0) in two banks "Bank 0" and "Bank 1" as indicated by the "Xs." FIG. 2B depicts an irregular update to different memory cells in two banks, i.e., the memory cell at row 1, column 0 of Bank 0 and the memory cell at row 2, column 1 of Bank 1.

A first set of pseudo code instructions 200 uses a baseline PIM implementation to make the regular updates to Bank 0 and Bank 1 of FIG. 2A and the irregular updates to Bank 0 and Bank 1 of FIG. 2B. The baseline PIM implementation uses separate instructions to read and update the value stored in each memory cell and then store the updated value back to each memory cell. For example, the first instruction "pim_read-add (bank 0, row 1, col 0, val 1)" causes the current value stored in Bank 0 at row 1, col 0 to be read, a first value "val 1" to be added to the current value, and the result stored in a local register. The second instruction "pim_store (bank 0, row 1, col 0)" causes the result to be stored back to the same location in Bank 0. The third and fourth instructions perform the same functions with respect to Bank 1. Thus, four instructions are needed to complete the regular update of FIG. 2A and the irregular update of FIG. 2B. Implementations are depicted in the figures and described herein in the context of a read-add for purposes of explanation, but implementations are not limited to this example and are applicable to any type of memory/arithmetic operation.

A second set of pseudo code instructions 210 uses a grouped PIM implementation to make the regular updates to Bank 0 and Bank 1 of FIG. 2A and the irregular updates to Bank 0 and Bank 1 of FIG. 2B. While still requiring four instructions, the grouped PIM implementation is more optimized than the baseline PIM implementation by grouping the pim_read-add commands and the pim_store commands to reduce overhead of interleaving read and write commands at fine granularity, such as read-to-write and write-to-read turnaround times in DRAM systems.

A third set of pseudo code instructions 220 uses a coalesced (regular) PIM implementation to make the regular updates to Bank 0 and Bank 1 of FIG. 2A and the irregular updates to Bank 0 and Bank 1 of FIG. 2B. The coalesced (regular) PIM implementation requires only three instructions to make the regular updates of FIG. 2A by using a single pim_broadcast_store instruction in place of the two PIM-specific pim_store instructions of the baseline and grouped PIM implementations. This is possible because the target memory cell is the same for both Bank 0 and Bank 1 for the regular updates of FIG. 2A. Thus, the coalesced (regular) PIM implementation can, for regular memory updates, reduce command bandwidth pressure and provide better performance.

The single pim_broadcast_store instruction cannot be used in place of the two PIM-specific pim_store instructions of the baseline and grouped PIM implementations to make the irregular updates of FIG. 2B because the target memory cells for the results are different, i.e., the result of the pim_read-add instruction for Bank 0 needs to be stored in the memory cell at row 1, col 0, while the result of the pim_read-add instruction for Bank 1 needs to be stored in the memory cell at row 2, col 1. Thus, as with the baseline and grouped PIM implementations, the coalesced (regular) PIM implementation requires four instructions to make the irregular updates to Bank 0 and Bank 1 of FIG. 2B.

B. Using Stored Address Information to Perform Memory Operations

According to an implementation, a coalesced (irregular) PIM implementation is used to perform irregular updates to memory using fewer memory commands than the baseline PIM, grouped PIM, and coalesced (regular) PIM approaches. With the coalesced (irregular) PIM implementation, near-memory compute units temporarily store the results and at least a portion of the address information for bank-specific memory operations in local storage and then use their respective stored results and address information for a subsequent broadcast memory operation. This allows a memory operation to be performed by near-memory compute units at multiple banks using bank-specific address information without having to issue a separate memory command to each bank.

According to an implementation, augmented near-memory compute instructions cause near-memory compute elements to store the results and the column address for bank-specific memory instructions in local storage. That is, the near-memory compute element for each bank stores the results and the column address for its respective bank-specific memory instruction in local storage, where the column address may be different across multiple banks. A special broadcast memory instruction, referred to herein as a "broadcast conditional near-memory instruction," causes the near-memory compute elements to perform a subsequent memory operation in parallel using their respective stored results and their current open row and respective stored column address, which may be different across the banks.

FIGS. 2A and 2B include a fourth set of pseudo code instructions 230 that provides an example implementation of the coalesced (irregular) PIM implementation. The instructions include augmented near-memory compute instructions, in the form of "pim_read-add+" instructions, as designated by the "+," for Bank 0 and Bank 1. The augmented near-memory compute instructions cause the results of the read-add operation to be stored in a local register in the same manner as the regular pim_read-add instructions in the baseline PIM, grouped PIM, and coalesced (regular) PIM approaches. Unlike the baseline PIM, grouped PIM, and coalesced (regular) PIM approaches, however, the pim_read-add+ instructions also cause at least a portion of the address information of the pim_read-add+ instructions to be stored in local storage. According to an implementation, the pim_read-add+ instructions cause the near-memory compute elements to store the column address of the pim_read-add+ instructions in local storage. Thus, the pim_read-add+ (bank 0, row 1, col 0, val 1) instruction causes the current value stored in Bank 0 at row 1, col 0 to be read, a first value "val 1" added to the current value, the result stored in a local register, and the col 0 address stored in local storage. Similarly, as depicted in FIG. 2B, the pim_read-add+(bank 1, row 2, col 1, val 2) instruction causes the current value stored in Bank 1 at row 2, col 1 to be read, a second value "val 2" added to the current value, the result stored in a local register, and the col 1 address to be stored in local storage.

As described in more detail hereinafter, the column addresses are stored in local storage in association with the results stored in the local registers to enable near-memory compute elements to later retrieve the address information that properly corresponds to a result stored in a register in response to a broadcast conditional near-memory instruction. Although the approach is depicted in the figures and described herein in the context of two pim_read-add+ instructions, implementations are not limited to this example and are applicable to any number and type of augmented near-memory compute instructions, including sequences of augmented near-memory compute instructions of varying types.

Continuing with the fourth set of pseudo code instructions 230, the broadcast conditional near-memory instruction "pim_broadcast_conditional_store" causes the near-memory compute element at each bank to store the results of the prior augmented near-memory compute operation to memory at the current open row and the column address saved in the local storage. In the example of FIG. 2B, the near compute element for Bank 0 causes the result of the pim_read-add+(bank 0, row 1, col 0, val 1) instruction to be stored to Bank 0 at the currently open row, which is row 1, and the column address saved in the local storage, which is column 0. The near compute element for Bank 1 causes the result of the pim_read-add+(bank 1, row 2, col 1, val 2) instruction to be stored to Bank 1 at the currently open row, which is row 2, and the column address saved in the local storage, which is column 1.

Although examples are depicted in the figures and described herein in the context of the broadcast conditional near-memory instruction being a store instruction writing to the exact same address as the first access, implementations are not limited to this example and are applicable to other types of instructions, such as reads. In addition, the broadcast instruction may perform its operation on a modification of the saved address information. According to an implementation, the broadcast memory operation is performed using the saved address information incremented by a value, such as a constant, or the same column address in a different row. According to an implementation, the broadcast conditional near-memory instruction specifies which near-memory compute elements are to process the instruction, e.g., via a bit mask that specifies a set of banks to process the instruction. This provides a programmer with the flexibility to specify which near-memory compute elements are to process a broadcast conditional near-memory command.

Using the stored address information in this manner allows a single broadcast conditional near-memory instruction to be used for any number of banks instead of requiring a bank-specific near-memory instruction for each bank, which provides the technical benefit of reducing the command bus bandwidth required for using near-memory compute elements to perform memory operations compared to conventional approaches that use a separate memory command for each bank. The approach also has lower command bandwidth requirements than approaches that compute bank-specific address information near memory using separate commands to prepare the bank-specific address information. The approach may be used for irregular updates to memory and regular updates to memory. For example, according to an implementation, the fourth set of pseudo code instructions 230 used for the irregular updates of FIG. 2B is used to perform the regular updates of FIG. 2A. Furthermore, the approach allows software developers to specify processing of memory commands using near-memory compute elements with fine granularity.

C. Local Storage

Figure 3A:
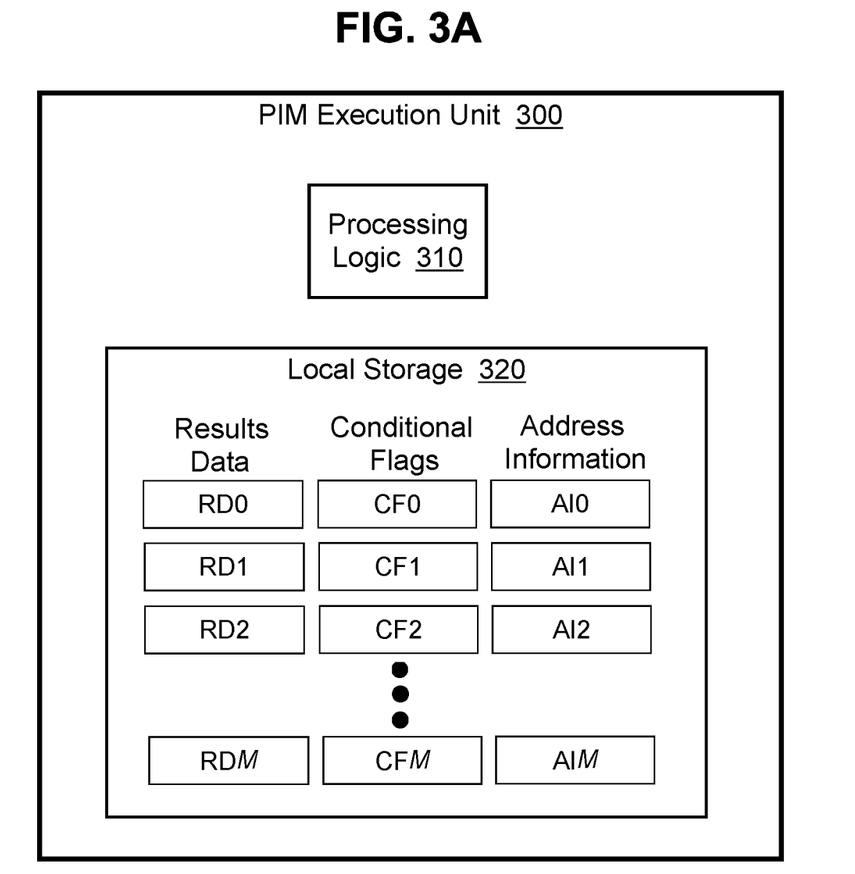
FIG. 3A is a block diagram that depicts an example implementation of a PIM execution unit.

Different types of local storage may be used for the coalesced (irregular) PIM approach and implementations are not limited to any particular type of local storage. FIG. 3A is a block diagram that depicts a PIM execution unit 300 that is an example implementation of the PIM execution units of FIG. 1. The PIM execution unit 300 includes processing logic 310 and local storage 320. The processing logic 310 is configured to process near-memory commands such as PIM commands according to the approaches described herein and includes compute elements, such as vector compute elements, for performing arithmetic and/or logical operations.

The local storage 320 stores data used to perform memory operations using near-memory processing elements according to the approaches described herein. More specifically, the local storage 320 stores results data RD0 through RDM, conditional flags CF0 through CFM, and address information AI0 through AIM. The results data RD0 through RDM are the results of processing augmented near-memory compute commands, such as the results of processing the pim_read-add+ instructions previously described herein. The address information AI0 through AIM is at least a portion of the address information used to process the augmented near-memory compute commands. According to an implementation, the address information AI0 through AIM is the column address used to process augmented near-memory compute commands. The conditional flags CF0 through CFM are data that indicates that the corresponding results data should be processed by a broadcast conditional near-memory command, as described in more detail hereinafter.

In the example of FIG. 3A, each memory element, e.g., bank, has its own local storage 320. Implementations are not limited to this example, however, and according to an implementation, a memory module includes a single local storage 320 that is used for all of the memory elements, e.g., banks. In this implementation, the single local storage 320 includes bank identification data in each row to identify the corresponding bank to which the data belongs. Alternatively, the single local storage 320 is segmented into portions where each portion is designated for a particular memory element, e.g., bank.

Figure 3B:
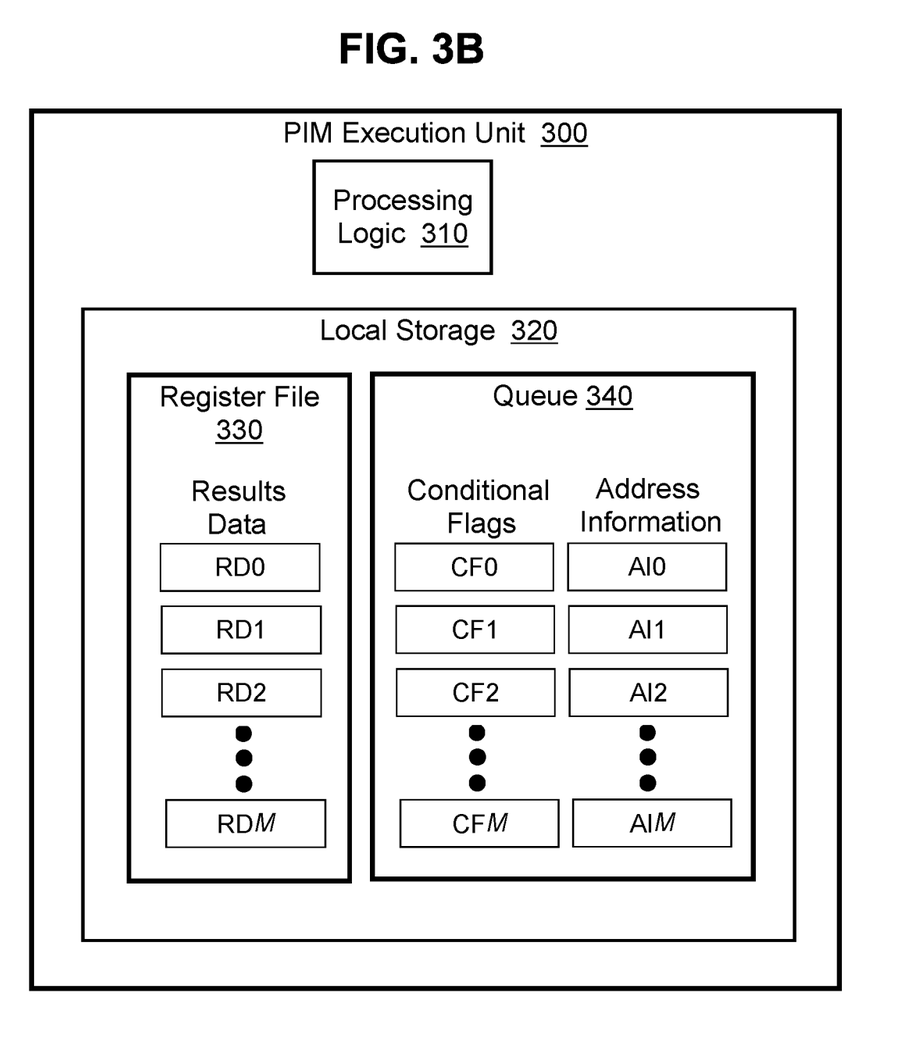
FIG. 3B is a block diagram that depicts a PIM execution unit where the results data is stored in a register file and the conditional flags and address information are stored in a queue.

In the example of FIG. 3A, the data in the local storage 320 is organized in rows to provide an implied correspondence between the results data, the conditional flags, and the address information, although implementations are not limited to this example and correspondence between these elements may be provided in any manner, e.g., via index information, pointers, etc. FIG. 3B is a block diagram that depicts a PIM execution unit 300 where the results data is stored in a register file 330 that is used to process near-memory commands and the conditional flags and address information are stored in a queue 340. In this implementation, each entry in the queue 340 corresponds to a register in the register file 330.

When the processing logic 310 for a particular bank processes an augmented near-memory compute command, the processing logic 310 updates the local storage 320 by causing the result and column for the near-memory compute command to be stored in the local storage 320 and setting the conditional flag. The destination may be, for example, the next available row or an open row in the local storage 320 of FIG. 3A, the next available entry in the register file 330 and the queue 340 of FIG. 3B, or specified by the augmented near-memory compute command.

The conditional flags specify whether the results data and corresponding address information are to be processed by a broadcast conditional near-memory command. For example, in response to a broadcast conditional near-memory command, the processing logic 310 for a particular bank examines the value of the conditional flag in the local storage 320, either the next row (FIG. 3A) or the next entry (head or tail) in the queue 340 (FIG. 3B) and if set (or unset), performs the memory operation specified by the broadcast conditional near-memory command using the results data and address information. For example, suppose that the broadcast conditional near-memory command is a broadcast conditional near-memory store command. The processing logic 310 causes the results data to be stored to the location in the bank specified by the currently open row of the bank and the column specified by address information A0, e.g., row 2, column 1 of Bank 1 (FIG. 2B). The processing logic 310 then resets the conditional flag so that that results data will not be processed again by another broadcast conditional near-memory command. According to an implementation, address information is used by multiple broadcast conditional near-memory commands. For example, a first broadcast conditional near-memory command uses the address information stored by an augmented near-memory compute command and then a second broadcast conditional near-memory command also uses the same address information, e.g., for a different broadcast memory operation. In this implementation, the conditional flag is not reset after the first broadcast conditional near-memory command to make the address information available for use by other broadcast conditional near-memory commands.

If the processing logic 310 determines that the conditional flag in a particular row or current entry in the queue 340 is not set, then the processing logic 310 proceeds to the next row or queue 340 entry in the local storage 320 and so on until a row or entry in the queue 340 is identified with the conditional flag set. If no row or queue 340 entry in the local storage 320 has a set conditional flag, then the broadcast conditional near-memory command is not processed further by that processing logic 310, although the processing logic 310 for other banks may process the broadcast conditional near-memory command, depending upon the values of the conditional flags in their respective local storage 320. This process is repeated for each broadcast conditional near-memory command. The use of conditional flags in this manner allows the local storage 320 to be used for both augmented near-memory compute commands and non-augmented near-memory compute commands, i.e., regular near-memory compute commands, since non-augmented near-memory compute commands will not set the conditional flags.

Although implementations are depicted in the figures and described herein in the context of each row in the local storage 320 of FIG. 3A and each entry in the queue 340 of FIG. 3B potentially storing processing results that are to be processed using broadcast conditional near-memory commands, this is not required and according to an implementation, one or more rows of the local storage 320 of FIG. 3A and/or one or more entries in the register file 330 of FIG. 3B are designated for regular use, i.e., not for the approaches described herein. For example, the processing logic 310 may be configured to not use certain rows and/or queue entries for storing results of augmented near-memory compute commands. As another example, certain portions of the local storage 320 may be specially designated for use with the approaches described herein.

The use of conditional flags is not required and according to an implementation, instead of using conditional flags, the presence of address information indicates that the corresponding results data is to be processed by a broadcast conditional near-memory command. For example, suppose that the processing logic 310 receives a broadcast conditional near-memory store command. If there is address information in the current row of the local storage 320 (FIG. 3A) or the current entry of the queue 340 (FIG. 3B), then the processing logic 310 stores the results data from the current row of the local storage 320 or the corresponding register in the register file 330, respectively, to a location in the bank defined by the currently open row and the column contained in the address information field of the current row. The processing logic then deletes the address information so that the same results data will not be used for the next broadcast conditional near-memory command. If the current row of the local storage 320 or the current entry of the queue 340 does not contain address information, then the processing logic 310 proceeds to the next row or entry in the queue 340.

Figure 4A:
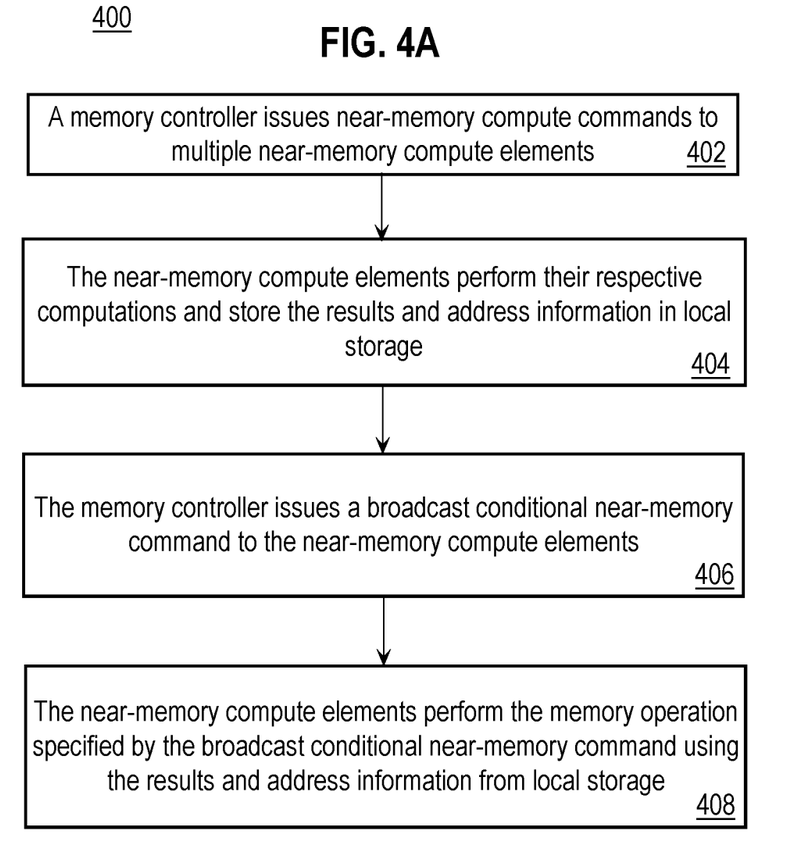
FIG. 4A is a flow diagram that depicts an approach for performing efficient memory operations using near-memory compute elements with augmented near-memory compute commands and broadcast conditional near-memory store commands from the memory controller perspective.

FIG. 4A is a flow diagram 400 that depicts an approach for performing efficient memory operations using near-memory compute elements with augmented near-memory compute commands and broadcast conditional near-memory store commands from the memory controller perspective.

In step 402, the memory controller 120 issues near-memory compute commands to multiple near-memory compute elements. This includes any number and type of near-memory compute commands, including multiple near-memory compute commands for one or more of the near-memory compute elements. For example, referring to the fourth set of pseudo code instructions 230 of FIG. 2B for the coalesced (irregular) PIM implementation, the memory controller 120 issues to bank 0 a near-memory compute command that corresponds to the pim_read-add+(bank 0, row 1, col 0, val 1) instruction and to bank 1 a near-memory compute command that corresponds to the pim_read-add+(bank 1, row 2, col 1, val 2) instruction.

In step 404, the near-memory compute elements process the near-memory compute commands and store the results and at least a portion of the address information for their respective near-memory compute commands in local storage. Continuing with the prior example, the near-memory compute elements for banks 0 and 1, e.g., the processing logic 310, process their respective near-memory compute commands, perform their respective computations, and store the results and the column address in the local storage 320, as previously described herein. According to an implementation, the near-memory compute elements for banks 0 and 1 also set the conditional flags to specify that the stored results and address information should be used for a broadcast conditional near-memory command.

Sometime later, in step 406, the memory controller 120 issues a broadcast conditional near-memory command to the near-memory compute elements, i.e., all the near-memory compute elements in the memory module 130. According to an implementation, the broadcast conditional near-memory command specifies which memory elements, e.g., target banks, are to process the broadcast conditional near-memory command, e.g., by one or more bit values or a bit mask.

In step 408, the near-memory compute elements perform the memory operation specified by the broadcast conditional near-memory command using the results and address information from local storage. In the present example, bank 0 stores the result of its computation to the memory location in bank 0 at the currently open row, which is row 1, and column 0, which is the column stored in the local storage 320. Bank 1 stores the result of its computation to the memory location in bank 1 at the currently open row, which is row 2, and column 1, which is the column stored in the local storage 320.

Figure 4B:
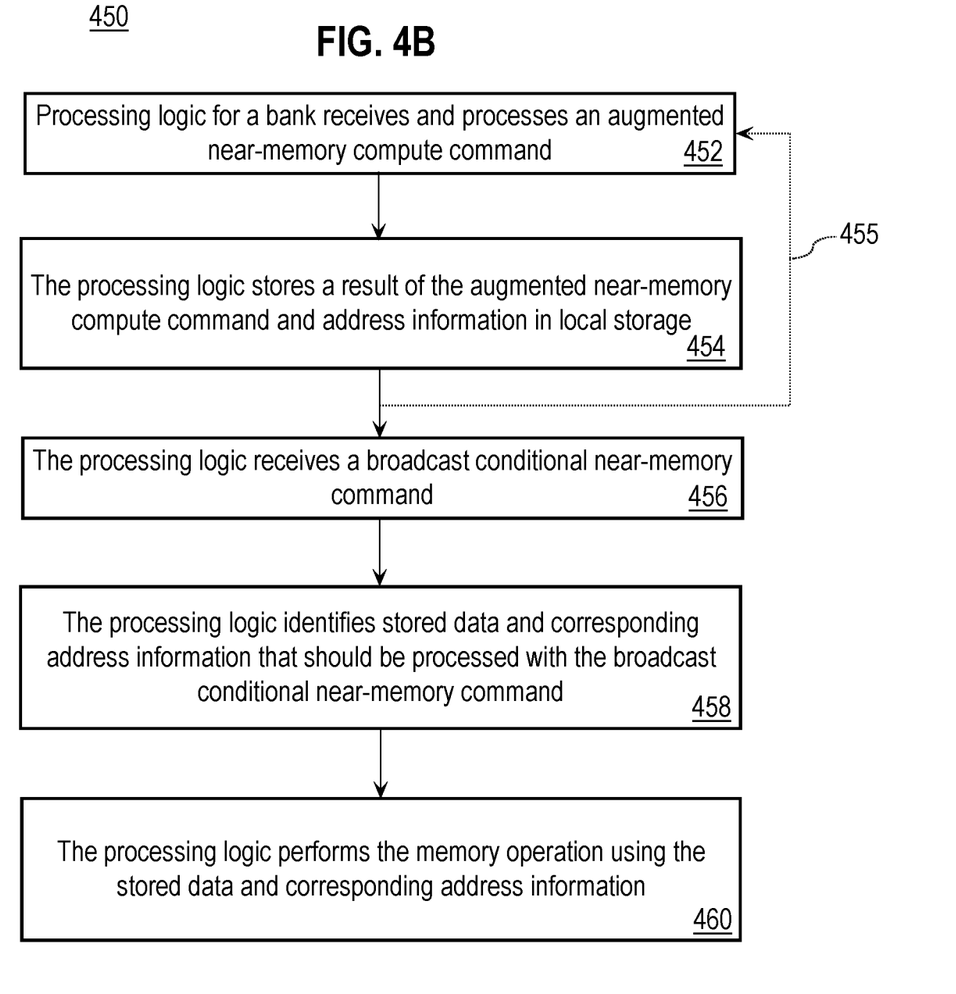
FIG. 4B is a flow diagram that depicts an approach for performing efficient memory operations using near-memory compute elements with augmented near-memory compute commands and broadcast conditional near-memory store commands from the memory module perspective.

FIG. 4B is a flow diagram 450 that depicts an approach for performing efficient memory operations using near-memory compute elements with augmented near-memory compute commands and broadcast conditional near-memory store commands from the memory module perspective.

In step 452, the processing logic for a bank receives and processes an augmented near-memory compute command. For example, the processing of the augmented near-memory compute instruction pim_read-add+(bank 0, row 1, col 0, val 1), as previously described herein, causes an augmented near-memory compute command to be issued to the processing logic 310 for bank 0 and the processing logic 310 for bank 0 performs the computation.

In step 454, the processing logic 310 for bank 0 stores a result of the computation and the address specified by the augmented near-memory compute command in the local storage 320. For example, the processing logic 310 stores the result and the column address of 0 in an open row of the local storage 320 of FIG. 3A, or in the register file 330 and queue 340 of FIG. 3B, respectively.

As indicated by reference number 455, steps 452 and 454 may be repeated for any number and types of augmented near-memory compute commands directed to any number of banks. For each augmented near-memory compute command, the processing logic 310 for the target bank processes the command and stores the result and target column in the local storage 320 as previously described herein. For example, the processing of the augmented near-memory compute instruction pim_read-add+(bank 1, row 2, col 1, val 2) causes an augmented near-memory compute command to be issued to the processing logic 310 for bank 1 and the processing logic 310 for bank 1 performs the computation and stores the result and column address 1 in the local storage 320. If conditional flags are being used, the processing logic 310 also sets the appropriate conditional flag, as previously described herein.

In step 456, the processing logic 310 for the memory elements receive a broadcast conditional near-memory command. The broadcast conditional near-memory command is issued by the memory controller 120 and may include bit values, such as a bit mask, that specifies which memory elements, e.g., target banks, are to process the broadcast conditional near-memory command.

In step 458, the processing logic 310 identifies stored data and corresponding address information to be processed with the broadcast conditional near-memory command. According to an implementation, this includes identifying a first row in the local storage 320 of FIG. 3A or an entry in the queue 340 of FIG. 3B that has its corresponding conditional flag set. In situations where the conditional flags are not used, this includes identifying the first row in the local storage 320 or the next entry in the queue 340 that has valid address information.

In step 460, the processing logic 310 for the memory elements perform the memory operation of the broadcast conditional near-memory command using the stored result data and the address information. For example, suppose that the broadcast conditional near-memory command is a broadcast conditional near-memory store command. The processing logic 310 stores the result to a location in memory at the currently open row and the column from the local storage 320. This is performed by each of the target memory elements specified by the broadcast conditional near-memory command, which enables a single broadcast command to be used to perform the near-memory operation at multiple memory elements, e.g., banks, to different memory locations, without having to issue a separate memory command to each memory element. According to an embodiment, steps 456 through 460 are performed for subsequent broadcast conditional near-memory commands using the same stored address information from the augmented near-memory command.

D. Memory Controller Considerations

As previously described herein, the broadcast conditional near-memory command causes near-memory compute elements to store the results of prior augmented near-memory compute commands to memory at the currently open row and the stored column. According to an implementation, the memory controller 120 ensures that the row specified by a prior augmented near-memory compute command for each bank is open for a subsequent broadcast conditional near-memory command so that the stored result will be stored at the correct row (and column). This may be accomplished in several ways that vary depending upon a particular implementation.

According to one implementation, the memory controller 120 does not issue augmented near-memory compute commands to a different row for a bank between a prior augmented near-memory compute command and a broadcast conditional near-memory command. For example, referring again to the fourth set of pseudo code instructions 230 for the coalesced (irregular) PIM implementation of FIG. 2B, suppose that the memory controller 120 processes the pim_read-add+(bank 0, row 1, col 0, val 1) instruction and issues an augmented near-memory compute command to bank 0, row 1, col 0. The memory controller 120 ensures that row 1 for bank 0 is open at the time bank 0 processes the broadcast conditional near-memory command. To accomplish this, the memory controller 120 ensures that no other augmented near-memory compute commands are issued to bank 0 for any row other than row 1 before the broadcast conditional near-memory command is processed by the processing logic 310 for bank 0. This ensures that the row 1 for bank 0 remains open for the broadcast conditional near-memory command.

According to another implementation, the memory controller 120 tracks the row used for the last, i.e., most recent, augmented near-memory compute command for each bank and ensures that row is open before the broadcast conditional near-memory command is processed by the processing logic 310 for each bank. This may be accomplished, for example, by the memory controller 120 issuing a command to open the row used by the last augmented near-memory compute command for each bank. This implementation allows more flexibility for the memory controller 120 to perform work that involves different rows in banks, e.g., using values in two different rows in a computation, at the cost of increased complexity to track the rows and potentially have to reopen them.

According to an implementation, the memory controller 120 groups, i.e., reorders, augmented near-memory compute commands by bank and row, followed by a broadcast conditional near-memory command. For example, the memory controller 120 groups all of the augmented near-memory compute commands for bank 0, row 1, and all of the augmented near-memory compute commands for bank 1, row 0, etc. This provides the technical benefit of reducing the overhead attributable to opening different rows in the same bank.

The approaches described herein are applicable to workloads that require certain ordering to ensure correctness, for example, workloads with memory operations that need to be performed in an atomic manner. According to an implementation, the memory controller 120 ensures that memory read commands to the same memory address (bank, row, column) as an augmented near-memory compute command are not reordered before a broadcast conditional near-memory store command. For example, suppose that an augmented near-memory compute command is directed to a memory location at bank 0, row 1, col 0. Suppose further that the augmented near-memory compute command is followed by a broadcast conditional near-memory store command, which in turn is followed by another memory read command to the same memory address (bank 0, row 1, col 0). Conventional memory controller reordering mechanisms may reorder this other memory read command ahead of the broadcast conditional near-memory store command to improve performance. This may lead to errors, however, if the augmented near-memory compute command updates the value from the memory location and stores the updated value in the local storage 320, but the updated value has not yet been stored back to memory when the other memory read command is processed, i.e., because the broadcast conditional near-memory store command has not yet been processed.

To address this issue where workloads require certain ordering, according to this implementation the memory controller 120 prevents this reordering from occurring. More specifically, the memory controller 120 ensures that memory read commands for the same memory address (bank, row, column) as an augmented near-memory compute command are not reordered before a broadcast conditional near-memory store command. This may include invoking Read After Write (RAW) functionality provided by some memory controllers. According to an implementation, the memory controller 120 prevents from being queued, memory read commands for any bank for which an augmented near-memory compute command was issued, until a broadcast conditional near-memory command has been enqueued.

According to an implementation, the memory controller 120 maintains tracking information that is used to determine whether memory commands can be issued to particular banks. The memory controller 120 tracks the number of augmented near-memory compute commands per bank and prevents memory commands from being issued to the currently open row of those banks until a sufficient number of broadcast conditional near-memory commands have been issued to ensure that the results data stored in the local storage of the banks have been processed. For example, suppose that no augmented near-memory compute commands have been issued to bank 0 and two augmented near-memory compute commands have been issued to bank 1. The memory controller 120 allows other memory commands to be issued to bank 0 since there are no results data for bank 0 waiting to be processed by a broadcast conditional near-memory command. The memory controller 120, however, prevents memory commands (reads or writes) from being issued to the currently open row of bank 1 until two broadcast conditional near-memory commands have been issued. Assuming no other augmented near-memory compute commands are issued to bank 1, two broadcast conditional near-memory commands will process the stored results data for bank 1 and the tracking information can be cleared or reset.

According to another implementation, the memory controller 120 maintains tracking information that tracks the bank and columns for augmented near-memory compute commands and prevents memory operations to those banks and columns from being enqueued until a broadcast conditional near-memory command has been enqueued. Then the tracking information can be cleared or reset and other memory operations to those banks and columns allowed to proceed. This implementation provides finer granularity and is less restrictive but has an additional cost of maintaining the column information for each bank.

According to another implementation, the processing logic 310 at near-memory compute elements is configured to generate an error if a memory read command to the same memory address of an augmented near-memory compute command is received before a broadcast conditional near-memory store command. For this implementation, when a read command is received for a bank, the corresponding processing logic 310 determines whether the local storage 320 includes an entry for the same row and column as the read command, indicating that there is a pending store of results data. If so, then the processing logic 310 generates an error that is made available to the memory controller 120, for example, using Error Correction Code (ECC) memory signaling.

According to another implementation, memory controllers do not explicitly enqueue in their queues broadcast conditional near-memory commands after augmented near-memory compute commands and instead use counters to track augmented near-memory compute commands that have been enqueued. The memory controllers then later issue one or more broadcast conditional near-memory commands based upon the values of the counters. For example, suppose that a particular implementation includes a memory module with eight banks. The memory controller 120 tracks the number of augmented near-memory compute commands that have been enqueued for each of the eight banks and periodically determines whether specified criteria are satisfied. Examples of specified criteria include, without limitation, an expiration of a specified amount of time and a high-water mark count. Suppose that in this example a high-water mark count is used as the specified criteria. The memory controller 120 compares the values for each of the eight counters and in response to one or more of the counters reaching the high-water mark, the memory controller 120 issues a number of broadcast conditional near-memory commands equal to the high-water mark. In the example where the high-water mark is 10, the memory controller 120 issues 10 broadcast conditional near-memory commands to cause the processing logic 310 for each of the eight banks to process their respective stored computation results and address information using the broadcast conditional near-memory commands, for example in the context of broadcast conditional near-memory store commands, store the computation results to memory. This implementation improves performance by reducing the number of queue entries in the memory controller occupied by broadcast conditional near-memory store commands and allows the memory controller to schedule when the broadcast conditional near-memory store commands should be issued. The specific criteria used vary depending upon a particular implementation. The functionality provided by the aforementioned implementations may be selectively enabled via system configuration, by special instructions, or by semantics attached to augmented near-memory compute instructions.

The invention claimed is:

1. A memory module, comprising:
a first compute element configured to:
   perform a first memory operation on a first memory element of a plurality of memory elements and store at least a portion of address information for the first memory operation in a local storage of the first compute element, and
   perform a second memory operation on the first memory element using the at least a portion of address information for the first memory operation, wherein the second memory operation is performed in response to a broadcast memory command issued to the plurality of memory elements.

2. The memory module of claim 1, wherein the at least a portion of address information for the first memory operation includes a column address.

3. The memory module of claim 1, wherein the first compute element is further configured to
   store, in the local storage of the first compute element, data that indicates that the at least a portion of address information for the first memory operation is to be used for the second memory operation.

4. The memory module of claim 1, wherein:
the first memory operation produces a result, and
the first compute element is further configured to store the result in the local storage of the first compute element and use the result to perform the second memory operation.

5. The memory module of claim 1, wherein the first compute element is further configured to:
   determine second address information based upon the at least a portion of address information for the first memory operation and use the second address information to perform a third memory operation.

6. The memory module of claim 1, wherein the first memory operation is performed in response to a first memory command issued to the first memory element.

7. The memory module of claim 6, further comprising:
a second compute element configured to:
   perform a third memory operation at a second memory element of the plurality of memory elements and store at least a portion of address information for the third memory operation in a local storage of the second compute element, wherein the third memory operation is performed in response to a third memory command issued to the second memory element and wherein the at least a portion of address information for the third memory operation is different than the at least a portion of address information for the first memory operation,
   perform a fourth memory operation at the second memory element using the at least a portion of address information for the third memory operation, and
   wherein the second memory operation and the fourth memory operation are performed in response to the broadcast memory command.

8. The memory module of claim 1, wherein the local storage of the first compute element comprises one or more local registers or one or more buffers.

9. The memory module of claim 1, wherein:
the first compute element is further configured to generate an error in response to determining that another memory command includes the at least a portion of the address information for the first memory operation and was received prior to a second memory command for the second memory operation.

10. A memory controller comprising:
processing logic configured to:
issue a first memory command to a first near-memory compute element, wherein the first memory command specifies that at least a portion of address information for the first memory command is to be stored in a first local storage for the first near-memory compute element,
issue a second memory command to a second near-memory compute element, wherein the second memory command specifies that at least a portion of address information for the second memory command is to be stored in a second local storage for the second near-memory compute element, wherein the at least a portion of address information for the second memory command is different than the at least a portion of address information for the first memory command, and
issue a broadcast memory command to the first and second near-memory compute elements, wherein processing of the broadcast memory command by the first near-memory compute element causes a first memory operation to be performed using the at least a portion of address information for the first memory command stored in the first local storage, and processing of the broadcast memory command by the second near-memory compute element causes a second memory operation to be performed using the at least a portion of address information for the second memory command stored in the second local storage.

11. The memory controller of claim 10, wherein the at least a portion of address information for the first memory command and the at least a portion of address information for the second memory command includes a column address.

12. The memory controller of claim 10, wherein the first memory command specifies that the at least a portion of address information for the first memory command is to be used for a subsequent broadcast memory command.

13. The memory controller of claim 10, wherein:
processing of the broadcast memory command by the first near-memory compute element causes the first memory operation to be performed using a result of the first memory command and the at least a portion of address information for the first memory command stored in the first local storage, and
processing of the broadcast memory command by the second near-memory compute element causes the second memory operation to be performed using a result of the second memory command and the at least a portion of address information for the second memory command stored in the second local storage.

14. The memory controller of claim 10, wherein:
the first memory operation specifies a particular row for the first near-memory compute element, and
the processing logic is further configured to perform one or more of:
keep the particular row for the first near-memory compute element open at least until the broadcast memory command is queued, or
reopen the particular row for the first near-memory compute element for the broadcast memory command.

15. The memory controller of claim 10, wherein:
the first memory operation specifies a particular row for the first near-memory compute element, and
the processing logic is further configured to enqueue, with the first memory command, one or more other memory commands to the particular row for the first near-memory compute element.

16. The memory controller of claim 10, wherein:
the first memory command specifies a particular row for the first near-memory compute element, and
the processing logic is further configured to not issue another memory command to the first near-memory compute element for the particular row after the first memory command and before the broadcast memory command.

17. The memory controller of claim 16, wherein:
the first memory command further specifies a particular column for the first near-memory compute element, and
the processing logic is further configured to not issue another memory command to the first near-memory compute element for the particular row and column after the first memory command and before the broadcast memory command.

18. The memory controller of claim 10, wherein the processing logic is further configured to:
track a number of near-memory compute commands that are issued to each of the first and second near-memory compute elements, wherein each of the near-memory compute commands specifies that a result and at least a portion of the address information for the near-memory compute command is to be stored to local storage, and
in response to the number of near-memory compute commands that are issued to one or more of the first and second near-memory compute elements satisfying specified criteria, issue a broadcast memory command which, when processed by the first and second near-memory compute elements, causes the broadcast memory command to be processed using a stored result and the at least a portion of the address information for the near-memory compute command.

19. A method comprising:
performing, by a first compute element of a plurality of compute elements at a memory module, a first memory operation on a first memory element of a plurality of memory elements and storing at least a portion of address information for the first memory operation in a local storage of the first compute element, and
performing, by the first compute element, a second memory operation using the at least a portion of address information for the first memory operation, wherein the second memory operation is performed in response to a broadcast memory command issued to the plurality of memory elements.

20. The method of claim 19, wherein the first memory operation is performed in response to a first memory command issued to the first memory element, the method further comprising:
performing, by a second compute element of the plurality of compute elements, a third memory operation at a second memory element of the plurality of memory elements and storing at least a portion of address information for the third memory operation in a local storage of the second compute element, wherein the third memory operation is performed in response to a third memory command issued to the second memory element wherein the at least a portion of address information for the third memory operation is different than the at least a portion of address information for the first memory operation,
performing, by the second compute element, a fourth memory operation at the second memory element using the at least a portion of address information for the third memory operation,
wherein the second memory operation performed at the first memory element and the fourth memory operation performed at the second memory element are performed in response to the broadcast memory command.

* * * * *